United States Patent
Jiang (10) Patent No.: US 10,455,039 B2
(45) Date of Patent: Oct. 22, 2019

(54) METHOD AND ROUTER FOR SENDING AND PROCESSING DATA

(71) Applicant: HUAWEI TECHNOLOGIES CO., LTD., Shenzhen (CN)

(72) Inventor: Sheng Jiang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 684 days.

(21) Appl. No.: 14/868,662

(22) Filed: Sep. 29, 2015

(65) Prior Publication Data

US 2016/0021206 A1 Jan. 21, 2016

Related U.S. Application Data

(63) Continuation of application No. PCT/CN2013/074008, filed on Apr. 10, 2013.

(51) Int. Cl.
*H04L 29/08* (2006.01)
*H04L 12/747* (2013.01)

(52) U.S. Cl.
CPC ........ *H04L 67/2804* (2013.01); *H04L 45/742* (2013.01)

(58) Field of Classification Search
CPC . H04L 63/0428; H04L 63/0272; H04L 63/08; H04L 45/742; H04L 67/10;
(Continued)

(56) References Cited

U.S. PATENT DOCUMENTS 6,442,594 B1 * 8/2002 Ouchi ............... G06Q 10/10
709/206
7,864,764 B1 1/2011 Ma et al.
(Continued)

FOREIGN PATENT DOCUMENTS

CN 1925462 3/2007
CN 102065107 5/2011
(Continued)

OTHER PUBLICATIONS

Office Action, dated May 25, 2017, in Chinese Application No. 201380000445.3, pp. 1-7.
(Continued)

*Primary Examiner* — Glenford J Madamba
(74) *Attorney, Agent, or Firm* — Conley Rose, P.C.

(57) ABSTRACT

The application provides a method and a router for sending and processing data. In the method, a first router receives a first Internet Protocol IP data packet sent by a network server, where the first IP data packet carries a first data adding instruction; and the first router searches, according to the first data adding instruction, a first local cache for to-be-added data that is indicated by the first data adding instruction, adds, to the first IP data packet, the to-be-added data that is indicated by the first data adding instruction, to form a second IP data packet, and sends the second IP data packet. Because a router can add data to an IP data packet according to a data adding instruction, flexibility of data combinations is improved, and because the IP data packet can support multiple times of data adding, the flexibility of data combinations is further improved.

18 Claims, 3 Drawing Sheets

(58) Field of Classification Search
CPC . H04L 67/2804; H04L 41/08; H04L 41/0893; H04L 45/02; H04L 45/04; H04L 61/103; H04L 61/2007; H04L 61/2084; H04L 61/6068; H04L 63/0471; H04L 63/105
USPC .......................................................... 709/213
See application file for complete search history.

(56) References Cited

U.S. PATENT DOCUMENTS

| | | | | |
|---|---|---|---|---|
| 8,000,263 | B2* | 8/2011 | Janneteau | H04L 29/12009 370/254 |
| 2007/0050491 | A1* | 3/2007 | Kataoka | H04L 67/2814 709/223 |
| 2008/0137615 | A1* | 6/2008 | Park | H04L 45/302 370/332 |
| 2009/0034499 | A1* | 2/2009 | Janneteau | H04L 29/12009 370/338 |
| 2012/0060029 | A1* | 3/2012 | Fluhrer | H04L 41/0893 713/160 |
| 2013/0007239 | A1 | 1/2013 | Agarwal et al. | |
| 2013/0041943 | A1 | 2/2013 | Ozawa | |
| 2013/0159383 | A1 | 6/2013 | Tuliani et al. | |
| 2014/0052812 | A1 | 2/2014 | Ozawa | |

FOREIGN PATENT DOCUMENTS

| | | |
|---|---|---|
| CN | 102316097 | 1/2012 |
| CN | 102834814 | 12/2012 |
| CN | 103024045 | 4/2013 |
| WO | 2012/144584 A1 | 10/2012 |
| WO | 2013/044987 A1 | 4/2013 |

OTHER PUBLICATIONS

International Search Report dated Jan. 23, 2014 in corresponding international application PCT/CN2013/074008.
PCT International Search Report dated Jan. 23, 2014 in corresponding International Patent Application No. PCT/CN2013/074008.
Extended European Search Report dated Feb. 11, 2016 in corresponding European Patent Application No. 13881749.9.

* cited by examiner

| Type identifier | Length indication identifier | Type identifier | Length indication identifier | Data adding instruction | Type identifier | Length indication identifier | Data adding instruction |

METHOD AND ROUTER FOR SENDING AND PROCESSING DATA

CROSS-REFERENCE TO RELATED APPLICATIONS

This application is a continuation of International Application No. PCT/CN2013/074008, filed on Apr. 10, 2013, which is hereby incorporated by reference in its entirety.

TECHNICAL FIELD

Embodiments of the application relate to communications technologies, and in particular, to a method and a router for sending and processing data.

BACKGROUND

In a communications network, people impose increasingly high requirements on transmission of content, and accordingly, a content delivery network (CDN) is introduced into the communications network, that is, content provided by an Internet content provider (ICP) is set on a CDN node that is close to a user equipment (UE), so that the UE can acquire required content nearby.

In the prior art, when a user needs to request content from an ICP, a domain name of a website from which content needs to be requested may be resolved first, that is, a domain name resolution request is sent to a domain name system (DNS). The DNS may finally determine a most suitable CDN node sequentially according to searches of many other DNSs, and send a resolution result, that is, an IP address, to a UE, and the UE requests content from the CDN node specified by the IP address.

During the implementation of the embodiments of the application, the inventor finds that an existing CDN network cannot desirably implement delivery of flexible combinations according to a user requirement, and before responding to a UE, a CDN proxy cache disposed on a CDN node needs to construct all content requested by the UE. Therefore, a content combination in the prior art is not flexible enough.

SUMMARY

Embodiments of the application provide a method and a router for sending and processing data, to improve flexibility of content obtained by a UE.

According to a first aspect, a method for sending and processing data is provided, including:

receiving, by a first router, a first Internet Protocol IP data packet sent by a network server, where the first IP data packet carries a first data adding instruction; and searching, by the first router according to the first data adding instruction, a first local cache for to-be-added data that is indicated by the first data adding instruction, adding, to the first IP data packet, the to-be-added data that is indicated by the first data adding instruction, to form a second IP data packet, and sending the second IP data packet.

In a first possible implementation manner, the first IP data packet further includes a second data adding instruction, and correspondingly, the second IP data packet includes the second data adding instruction; and after the sending the second IP data packet, the method further includes:

receiving, by a second router, the second IP data packet sent by the first router; and searching, by the second router according to the second data adding instruction, a second local cache for to-be-added data that is indicated by the second data adding instruction, adding, to the second IP data packet, the to-be-added data that is indicated by the second data adding instruction, to form a third IP data packet, and sending the third IP data packet.

With reference to the first aspect or the first possible implementation manner of the first aspect, in a second possible implementation manner, the first data adding instruction includes a first content identifier and/or a first application identifier, and the second data adding instruction includes a second content identifier and/or a second application identifier;

the first content identifier or the first application identifier is an identifier for identifying the to-be-added data that is indicated by the first data adding instruction, and the first application identifier is a specific category of the first content identifier, and the second content identifier or the second application identifier is an identifier for identifying the to-be-added data that is indicated by the second data adding instruction, and the second application identifier is a specific category of the second content identifier.

With reference to the second possible implementation manner of the first aspect, in a third possible implementation manner, the first IP data packet further includes: a first type identifier and/or a first length indication identifier, where the first type identifier is used to instruct the first router to add, to the first IP data packet, the to-be-added data that is indicated by the first data adding instruction, and the first length indication identifier is used to indicate a length of the first data adding instruction; and the second IP data packet further includes: a second type identifier and/or a second length indication identifier, where the second type identifier is used to instruct the second router to add, to the second IP data packet, the to-be-added data that is indicated by the second data adding instruction; and the second length indication identifier is used to indicate a length of the second data adding instruction.

With reference to the second possible implementation manner of the first aspect or the third possible implementation manner of the first aspect, in a fourth possible implementation manner, the first IP data packet further includes a first location indication identifier, and the first location indication identifier is used to indicate a location of the to-be-added data that is indicated by the first data adding instruction and is in the second IP data packet; and the second IP data packet further includes a second location indication identifier, and the second location indication identifier is used to indicate a location of the to-be-added data that is indicated by the second data adding instruction and is in the third IP data packet.

With reference to the fourth possible implementation manner of the first aspect, in a fifth possible implementation manner, the first data adding instruction and the second data adding instruction each are in a form of a sub-option in a TLV format, and the sub-option in the TLV format includes the type identifier, the length indication identifier, and the data adding instruction.

With reference to the fifth possible implementation manner of the first aspect, in a sixth possible implementation manner, the first data adding instruction and the second data adding instruction each are carried in a sub-option of a hop-by-hop header.

According to a second aspect, a router is provided, including:

a receiver, configured to receive a first Internet Protocol IP data packet sent by a network server, where the first IP data packet carries a first data adding instruction; and a processor, configured to search, according to the first data adding instruction, a first local cache for to-be-added data that is indicated by the first data adding instruction, add, to the first IP data packet, the to-be-added data that is indicated by the first data adding instruction, to form a second IP data packet, and send the second IP data packet.

In a first possible implementation manner, the first IP data packet further includes a second data adding instruction, and correspondingly, the second IP data packet includes the second data adding instruction;

the receiver is further configured to receive the second IP data packet sent by the first router; and the processor is further configured to search, according to the second data adding instruction, a second local cache for to-be-added data that is indicated by the second data adding instruction, add, to the second IP data packet, the to-be-added data that is indicated by the second data adding instruction, to form a third IP data packet, and send the third IP data packet.

With reference to the second aspect or the first possible implementation manner of the second aspect, in a second possible implementation manner, the first data adding instruction includes a first content identifier and/or a first application identifier, and the second data adding instruction includes a second content identifier and/or a second application identifier;

the first content identifier or the first application identifier is an identifier for identifying the to-be-added data that is indicated by the first data adding instruction, and the first application identifier is a specific category of the first content identifier; and the second content identifier or the second application identifier is an identifier for identifying the to-be-added data that is indicated by the second data adding instruction, and the second application identifier is a specific category of the second content identifier.

With reference to the second possible implementation manner of the second aspect, in a third possible implementation manner, the first IP data packet further includes: a first type identifier and/or a first length indication identifier, where the first type identifier is used to instruct the first router to add, to the first IP data packet, the to-be-added data that is indicated by the first data adding instruction, and the first length indication identifier is used to indicate a length of the first data adding instruction; and the second IP data packet further includes: a second type identifier and/or a second length indication identifier, where the second type identifier is used to instruct a second router to add, to the second IP data packet, the to-be-added data that is indicated by the second data adding instruction, and the second length indication identifier is used to indicate a length of the second data adding instruction.

With reference to the second possible implementation manner of the second aspect or the third possible implementation manner of the second aspect, in a fourth possible implementation manner, the first IP data packet further includes a first location indication identifier, and the first location indication identifier is used to indicate a location of the to-be-added data that is indicated by the first data adding instruction and is in the second IP data packet; and the second IP data packet further includes a second location indication identifier, and the second location indication identifier is used to indicate a location of the to-be-added data that is indicated by the second data adding instruction and is in the third IP data packet.

With reference to the fourth possible implementation manner of the second aspect, in a fifth possible implementation manner, the first data adding instruction and the second data adding instruction each are in a form of a sub-option in a TLV format, and the sub-option in the TLV format includes the type identifier, the length indication identifier, and the data adding instruction.

With reference to the fifth possible implementation manner of the second aspect, in a sixth possible implementation manner, the first data adding instruction and the second data adding instruction each are carried in a sub-option of a hop-by-hop header.

It can be known from the foregoing technical solutions that, in the embodiments of the application, a first router receives a first Internet Protocol IP data packet sent by a network server, where the first IP data packet carries a first data adding instruction; and the first router searches, according to the first data adding instruction, a first local cache for to-be-added data that is indicated by the first data adding instruction, adds, to the first IP data packet, the to-be-added data that is indicated by the first data adding instruction, to form a second IP data packet, and sends the second IP data packet. Because a router can add data to an IP data packet according to a data adding instruction, flexibility of data combinations can be improved, and further, because the IP data packet can support multiple times of data adding, the flexibility of data combinations is further improved.

BRIEF DESCRIPTION OF DRAWINGS

To describe the technical solutions in the embodiments of the application more clearly, the following briefly introduces the accompanying drawings required for describing the embodiments. Apparently, the accompanying drawings in the following description show some embodiments of the application, and persons of ordinary skill in the art may still derive other drawings from these accompanying drawings without creative efforts.

DESCRIPTION OF EMBODIMENTS

A method for sending and processing data provided in embodiments of the application may be specifically applied when an intermediate node of a communications system adds content to an IP data packet. The method for sending and processing data provided in the embodiments may be specifically executed by a router, and the method for sending and processing data may be specifically implemented by using software and/or hardware. The method for sending and processing data provided in the embodiments is described in detail in the following.

Figure 1:
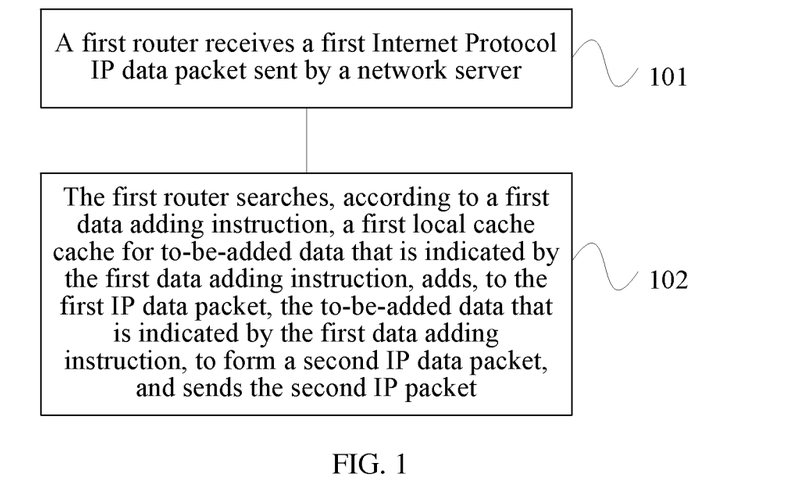
FIG. 1 is a schematic flowchart of a method for sending and processing data according to an embodiment of the application.

FIG. 1 is a schematic flowchart of a method for sending and processing data according to an embodiment of the application. As shown in FIG. 1, the method for sending and processing data provided in this embodiment specifically includes the following steps:

Step S101: A first router receives a first Internet Protocol IP data packet sent by a network server.

Specifically, the first IP data packet carries at least one data adding instruction. The first router may be disposed on a network node between a user equipment UE and the network server, and the first router and the first local cache are connected to each other. Data that is requested frequently by the UE from the network server may be stored in a local cache. It should be noted that, a network architecture provided in this embodiment of the application is different from a CDN architecture in the prior art in at least two aspects: First, the local cache in this embodiment is disposed on a router that is close to the UE, for example, the local cache in this embodiment of the application is disposed on a router of a city level or a county level, so that the local cache is relatively close to the UE, and therefore data can be delivered accurately according to a location of the UE. Second, in this embodiment, a domain name system (DNS) redirection technology does not need to be used to direct a request of the UE to a local cache, but instead, a user request is directly directed to a closest local cache by using a network server, thereby avoiding dependence on the DNS system, and further avoiding a performance bottleneck caused when multiple UEs access the DNS system at the same time, and saving time consumed by searching multiple DNSs.

In this embodiment, the network server may be an Internet content provider (ICP) server, may be an application (APP), or may be another apparatus or software having functions of this embodiment, which is not limited in this embodiment.

When a UE needs to request data from a network server, the UE first sends a data request to the network server; then the network server returns a first IP data packet to the UE, where the first IP data packet carries requested data that is indicated by the data request. Information about data stored in each local cache is configured on the network server. For the first IP data packet returned by the network server to the UE, there may be at least three cases. In a first case, if the network server determines that the requested data that is indicated by the data request is not stored in a local cache between the network server and the UE, the first IP data packet returned by the network server to the UE carries all the requested data that is indicated by the data request. In a second case, if the network server determines that a part of the requested data that is indicated by the data request is not stored in a local cache between the network server and the UE, the first IP data packet returned by the network server to the UE carries the part of the requested data that is indicated by the data request, and at the same time, the first IP data packet also carries a data adding instruction indicating that the other part of the data needs to be added, where it should be noted that the other part of the requested data that is indicated by the data request may be found by searching a local cache by using a router on a node between the network server and the UE and then is added, and one or more routers may exist. In a third case, if the network server determines that all the requested data that is indicated by the data request is stored in a local cache between the network server and the UE, the first IP data packet returned by the network server to the UE carries all data adding instructions that are carried in the data request sent by the UE.

Step S102: The first router searches, according to a first data adding instruction, a first local cache for to-be-added data that is indicated by the first data adding instruction, adds, to the first IP data packet, the to-be-added data that is indicated by the first data adding instruction, to form a second IP data packet, and sends the second IP data packet.

Specifically, the second case and the third case in the foregoing are described in detail in this embodiment. After a network server sends a first IP data packet to a UE, a first router disposed between the UE and the network server receives the first IP data packet sent by the network server, intercepts the first IP data packet, parses out a first data adding instruction in the first IP data packet, and adds, to the first IP data packet, to-be-added data that is indicated by the first data adding instruction, to form a second IP data packet, where the second IP data packet carries at least one second data adding instruction, or the second IP data packet carries no second data adding instruction.

According to the method for sending and processing data provided in this embodiment of the application, a first router receives a first Internet Protocol IP data packet sent by a network server, where the first IP data packet carries a first data adding instruction; and then the first router searches, according to the first data adding instruction, a first local cache for to-be-added data that is indicated by the first data adding instruction, adds, to the first IP data packet, the to-be-added data that is indicated by the first data adding instruction, to form a second IP data packet, and sends the second IP data packet. Because a router can add corresponding data to an IP data packet according to a data adding instruction, flexibility of data combinations can be improved, and further, because the IP data packet can support multiple times of data adding, the flexibility of data combinations is further improved.

Further, the first IP data packet may further include a second data adding instruction; and correspondingly, the second IP data packet includes the second data adding instruction.

After step S102 in which the first router searches, according to the first data adding instruction, the first local cache for the to-be-added data that is indicated by the first data adding instruction, adds, to the first IP data packet, the to-be-added data that is indicated by the first data adding instruction, to form the second IP data packet, and sends the second IP data packet, the method may further include:

receiving, by a second router, the second IP data packet sent by the first router; and searching, by the second router according to the second data adding instruction, a second local cache for to-be-added data that is indicated by the second data adding instruction, adding, to the second IP data packet, the to-be-added data that is indicated by the second data adding instruction, to form a third IP data packet, and sending the third IP data packet.

Specifically, the second data adding instruction may be used to instruct the second router to add, to the second IP data packet, the to-be-added data that is indicated by the second data adding instruction; and further, the second data adding instruction may instruct the second router to add, to a location indicated by a location indication identifier of the second IP data packet, the to-be-added data that is indicated by the second data adding instruction. In this embodiment, a difference from the prior art in which data of an entire web page is added by using a domain name in a CDN lies in that, data may be added according to the second data adding instruction in the second IP data packet, thereby improving flexibility of data combinations.

Further, the second IP data packet may carry multiple data adding instructions; in this case, the second router intercepts the second IP data packet, parses out all the data adding instructions in the second IP data packet, adds, according to the data adding instructions, to the second IP data packet, new data that can be added by the second router, and keeps, in the second IP data packet, a data adding instruction that cannot be operated by the second router, to form a third IP data packet. A next router intercepts the third IP data packet, parses out the remaining data adding instruction, and adds corresponding data to the third IP data packet according to the data adding instruction, or reconstructs a new IP data packet. In this way, in this embodiment, multiple times of data adding can be supported, thereby improving flexibility of data combinations.

Alternatively, the second router sends a third IP data packet, where the third IP data packet carries no data adding instruction, and in this case, the second router sends the third IP data packet to the UE.

Further, in this embodiment, after corresponding data is added to the first IP data packet, the second IP data packet, or the third IP data packet, the corresponding adding instruction, that is, the first data adding instruction, the second data adding instruction, or the third data adding instruction may be deleted.

In this embodiment, the first data adding instruction may be set in a sub-option of an IPv6 hop-by-hop header (Hop-by-Hop Header), and during transmission of the first IP data packet, the first router may add new content to the first IP data packet according to the first data adding instruction carried in the sub-option of the hop-by-hop header, to form the second IP data packet.

Further, in this embodiment, the second data adding instruction may be set in a sub-option of the IPv6 hop-by-hop header, and during transmission of the second IP data packet, the second router may add new content to the second IP data packet according to the second data adding instruction carried in the sub-option of the hop-by-hop header, to form the third IP data packet.

Figure 2:
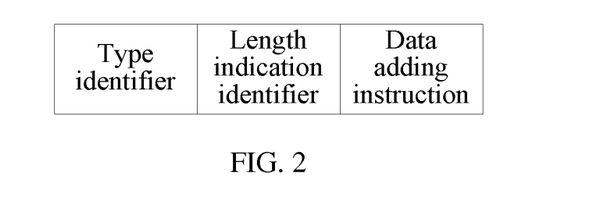
FIG. 2 is a schematic diagram of a format of a sub-option in an IP data packet according to an embodiment of the application.

FIG. 2 is a schematic diagram of a format of a sub-option in an IP data packet according to an embodiment of the application. As shown in FIG. 2, a sub-option, in which a data adding instruction is set, of an IPv6 hop-by-hop header in this embodiment specifically includes: a type identifier, a length indication identifier, and a data adding instruction.

Specifically, a first IP data packet may include: a first type identifier and/or a first length indication identifier.

The first type identifier is used to instruct a first router to add, to the first IP data packet, to-be-added data that is indicated by a first data adding instruction, where the first type identifier may occupy 8 bits (bits), and a quantity of bits of the type identifier is not limited in this embodiment.

The first length indication identifier is used to indicate a length of the first data adding instruction, where the first length indication identifier may occupy 8 bits, and a quantity of bits of the indication identifier is not limited in this embodiment.

Correspondingly, a second IP data packet may include: a second type identifier and/or a second length indication identifier.

The second type identifier is used to instruct a second router to add, to the second IP data packet, to-be-added data that is indicated by a second data adding instruction, where the second type identifier may occupy 8 bits (bits), and a quantity of bits of the type identifier is not limited in this embodiment.

The second length indication identifier is used to indicate a length of the second data adding instruction, where the second length indication identifier may occupy 8 bits, and a quantity of bits of the indication identifier is not limited in this embodiment.

Further, the first data adding instruction may further include a first content identifier and/or a first application identifier.

The first content identifier or the first application identifier is an identifier for identifying the to-be-added data that is indicated by the first data adding instruction, and the first application identifier is a specific category of the first content identifier.

In this embodiment, the sub-option of the IPv6 hop-by-hop header carries a first data adding instruction, where the first data adding instruction may include a first content identifier and/or a first application identifier. The first content identifier or the first application identifier is an identifier for identifying data to be added to a first IP data packet. If both the first content identifier and the first application identifier are set in the first data adding instruction, the first application identifier may be a specific category of the first content identifier. For example, the first application identifier is an identifier of a home page of a website, and the first content identifier is an identifier of news content. If the first data adding instruction includes the first content identifier, the first router searches, according to the first content identifier included in the first data adding instruction, a local cache for data of the home page of the website that corresponds to the first content identifier, and adds the data of the home page of the website to the first IP data packet; or if the first data adding instruction includes the first content identifier, the first router searches, according to the first content identifier included in the first data adding instruction, a local cache for data of the news content that corresponds to the content identifier, and adds the data of the news content to the first IP data packet; or the first data adding instruction includes the first application identifier and the first content identifier, the first router searches, according to the first application identifier and the first content identifier that are included in the first data adding instruction, a local cache for data of the news content in the home page of the website that corresponds to the first application identifier and the first content identifier, and adds the data of the news content in the home page of the website to the first IP data packet. It should be noted that, the type identifier corresponds to the first data adding instruction, that is, different first type identifiers may be updated according to different first data adding instructions. The first content identifier or the first application identifier included in the first data adding instruction may be a number, code, text, or in any other form that can be implemented by persons skilled in the art, which is not limited in this embodiment. Moreover, specific content indicated by an application identifier and a content identifier is not limited in this embodiment.

The second data adding instruction may further include a second content identifier and/or a second application identifier.

The second content identifier or the second application identifier is an identifier for identifying the to-be-added data that is indicated by the second data adding instruction, and the second application identifier is a specific category of the second content identifier.

In this embodiment, an application in which the second data adding instruction includes the second content identifier and/or the second application identifier is similar to the foregoing application method of the first content identifier and/or the first application identifier, and details are not described herein again.

Figure 3:
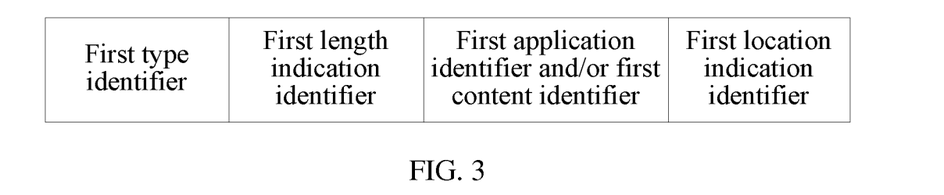
FIG. 3 is a schematic diagram of a format of a sub-option in an IP data packet according to another embodiment of the application.

FIG. 3 is a schematic diagram of a format of a sub-option in an IP data packet according to another embodiment of the application. Based on the foregoing embodiment shown in FIG. 2, a first data adding instruction in this embodiment may further include a first location indication identifier, and a second data adding instruction may further include a second location indication identifier.

As shown in FIG. 3, based on the embodiment shown in FIG. 2, a sub-option, in which the first data adding instruction is set, of an IPv6 hop-by-hop header in this embodiment specifically includes:

a first type identifier, used to instruct the first router to add, to the first IP data packet, the to-be-added data that is indicated by the first data adding instruction, where the first type identifier may occupy 8 bits, and a quantity of bits of the type identifier is not limited in this embodiment;

a first length indication identifier, used to indicate a length of the first data adding instruction, where the first length indication identifier may occupy 8 bits, and a quantity of bits of the indication identifier is not limited in this embodiment; and a first location indication identifier, used to indicate a location of the to-be-added data that is indicated by the first data adding instruction and is in the second IP data packet.

In this embodiment, for the first data adding instruction, there may be at least three cases. In a first case, the first data adding instruction includes a first application identifier and a first location indication identifier. In a second case, the first data adding instruction includes a first content identifier and a first location indication identifier. In a third case, the first data adding instruction includes a first application identifier, a first content identifier, and a first location indication identifier. Specific settings of the first application identifier and the first content identifier are similar to those of the embodiment shown in FIG. 2, and details are not described herein again.

In this embodiment, the first location indication identifier may indicate a location, to which data is to be added, in the first IP data packet, that is, the first location indication identifier may instruct to add corresponding data to a preset location in the first IP data packet, or may instruct to add data to a location that is at a certain offset from a header of an IP data packet. Being similar to the foregoing embodiment, the first type identifier corresponds to the first data adding instruction, that is, different first type identifiers may be updated according to different first data adding instructions. The first content identifier or the first application identifier included in the first data adding instruction may be a number, code, text, or in any other form that can be implemented by persons skilled in the art, which is not limited in this embodiment. Moreover, specific content indicated by an application identifier and a content identifier is not limited in this embodiment.

The second IP data packet may further include: a second type identifier and/or a second length indication identifier.

The second type identifier is used to instruct the second router to add, to the second IP data packet, the to-be-added data that is indicated by the second data adding instruction.

The second length indication identifier is used to indicate a length of the second data adding instruction.

In this embodiment, an application in which the second IP data packet includes the second type identifier and/or the second length indication identifier is similar to the foregoing application method of the second type identifier and/or the second length indication identifier, and details are not described herein again.

Figure 4:
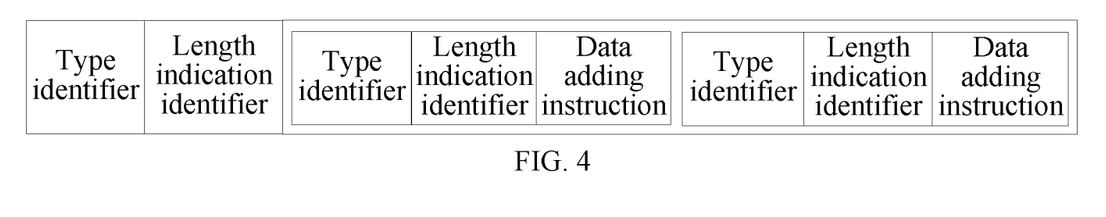
FIG. 4 is a schematic diagram of a format of a sub-option in an IP data packet according to still another embodiment of the application.

FIG. 4 is a schematic diagram of a format of a sub-option in an IP data packet according to still another embodiment of the application. As shown in FIG. 4, based on the foregoing embodiments, the first data adding instruction and the second data adding instruction may be in a form of a sub-option in a TLV format, where the sub-option in the TLV format includes a type identifier, a length indication identifier, and a data adding instruction.

Specifically, setting methods and effects of the type identifier, the length indication identifier, and the data adding instruction that are included in the sub-option in the TLV format are similar to those of the type identifier, the length indication identifier, and the data adding instruction in the foregoing embodiments, and details are not described herein again.

It should be noted that, multiple sub-options in the TLV format may be set for the data adding instruction, and each sub-option in the TLV format is set independently. A router may intercept the IP data packet, parses out all data adding instructions of the sub-options in the TLV format, adds, to the IP data packet according to the data adding instructions, new data that can be added by the router, and keeps, in the IP data packet, a data adding instruction that cannot be added by the router, so that a next router parses out, after parsing out the IP data packet, the remaining data adding instruction, and adds corresponding data to the IP data packet according to the data adding instruction, or reconstructs a new IP data packet. In this embodiment, multiple times of data adding can be supported, thereby improving flexibility of data combinations.

Figure 5:
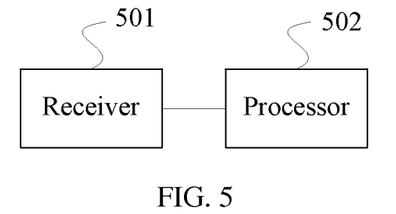
FIG. 5 is a schematic structural diagram of a router according to an embodiment of the application.

FIG. 5 is a schematic structural diagram of a router according to an embodiment of the application. As shown in FIG. 5, the router provided in this embodiment may specifically implement the steps of the method for sending and processing data provided in any embodiment of the application, and details are not described herein again. The router provided in this embodiment specifically includes: a receiver 501 and a processor 502.

Specifically, the receiver 501 is configured to receive a first Internet Protocol IP data packet sent by a network server, where the first IP data packet carries a first data adding instruction.

The processor 502 is configured to search, according to the first data adding instruction, a first local cache for to-be-added data that is indicated by the first data adding instruction, add, to the first IP data packet, the to-be-added data that is indicated by the first data adding instruction, to form a second IP data packet, and send the second IP data packet.

Further, the first IP data packet further includes a second data adding instruction, and correspondingly, the second IP data packet includes the second data adding instruction.

The receiver 501 is further configured to receive the second IP data packet sent by the first router.

The processor 502 is further configured to search, according to the second data adding instruction, a second local cache for to-be-added data that is indicated by the second data adding instruction, add, to the second IP data packet, the to-be-added data that is indicated by the second data adding instruction, to form a third IP data packet, and send the third IP data packet.

Further, the first data adding instruction includes a first content identifier and/or a first application identifier, and the second data adding instruction includes a second content identifier and/or a second application identifier.

The first content identifier or the first application identifier is an identifier for identifying the to-be-added data that is indicated by the first data adding instruction, and the first application identifier is a specific category of the first content identifier.

The second content identifier or the second application identifier is an identifier for identifying the to-be-added data that is indicated by the second data adding instruction, and the second application identifier is a specific category of the second content identifier.

Further, the first IP data packet further includes: a first type identifier and/or a first length indication identifier.

The first type identifier is used to instruct the first router to add, to the first IP data packet, the to-be-added data that is indicated by the first data adding instruction.

The first length indication identifier is used to indicate a length of the first data adding instruction.

The second IP data packet further includes: a second type identifier and/or a second length indication identifier.

The second type identifier is used to instruct a second router to add, to the IP data packet, the to-be-added data that is indicated by the second data adding instruction.

The second length indication identifier is used to indicate a length of the second data adding instruction.

Further, the first IP data packet further includes a first location indication identifier, and the first location indication identifier is used to indicate a location of the to-be-added data that is indicated by the first data adding instruction and is in the second IP data packet.

The second IP data packet further includes a second location indication identifier, and the second location indication identifier is used to indicate a location of the to-be-added data that is indicated by the second data adding instruction and is in the third IP data packet.

Further, the first data adding instruction and the second data adding instruction each are in a form of a sub-option in a TLV format, and the sub-option in the TLV format includes the type identifier, the length indication identifier, and the data adding instruction.

Further, the first data adding instruction and the second data adding instruction each are carried in a sub-option of a hop-by-hop header.

The router in this embodiment may be configured to execute the technical solution in the method embodiment shown in FIG. 1. The implementation principle and technical effect of the router is similar to those of the method embodiment shown in FIG. 1, and details are not described herein again.

In the several embodiments provided in the application, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, functional units in the embodiments of the application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium, which includes several instructions for instructing a computer device (which may be a personal computer, a server, or a network device) or a processor (processor) to perform a part of the steps of the methods described in the embodiments of the application. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In an actual application, the foregoing functions can be allocated to different functional modules for implementation according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the application, but are not for limiting the application. Although the application is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the application.

What is claimed is:

1. A method for sending and processing data, the method being performed by a first router disposed between a User Equipment (UE) and a network server, the method comprising:

receiving a first Internet Protocol (IP) data packet sent from the network server, wherein the first IP data packet is a response to a data request sent by the UE for requesting data from the network server, wherein the data requested by the UE from the network server comprises a first requested data, wherein the first IP data packet comprises information for instructing the first router to add the first requested data to the first IP data packet, and wherein the first IP data packet comprises an identifier of the first requested data but the first IP data packet does not comprise the first requested data;

adding the first requested data locally stored in the first router to the first IP data packet, to form a second IP data packet; and sending the second IP data packet towards the UE.

2. The method according to claim 1, wherein the data requested by the UE from the network server further comprises a second requested data, wherein the first IP data packet further instructs a second router to add the second requested data to the second IP data packet, wherein sending the second IP data packet towards the UE comprises:

sending the second IP data packet to the UE via the second router.

3. The method according to claim 1, wherein the identifier of the first requested data comprises a first content identifier and/or a first application identifier, and the first content identifier or the first application identifier is an identifier for identifying the first requested data, and the first application identifier is a specific category of the first content identifier.

4. The method according to claim 1, wherein the first IP data packet further comprises: a first type identifier, wherein the first type identifier is used to instruct the first router to add, to the first IP data packet, the first requested data.

5. The method according to claim 1, wherein the first IP data packet further comprises a first location indication identifier, and the first location indication identifier is used to indicate a location of the first requested data in the second IP data packet.

6. The method according to claim 1, wherein the identifier of the first requested data is carried in a sub-option of a hop-by-hop header of the first IP data packet.

7. A router disposed between a User Equipment (UE) and a network server, comprising:

a receiver, configured to receive a first Internet Protocol (IP) data packet sent from the network server, wherein the first IP data packet is a response to a data request sent by the UE for requesting data from the network server, wherein the data requested by the UE from the network server comprises a first requested data, wherein the first IP data packet comprises information for instructing the router to add the first requested data to the first IP data packet, and wherein the first IP data packet comprises an identifier of the first requested data but the first IP data packet does not comprise the first requested data; and a processor, configured to
 add the first requested data locally stored in the router to the first IP data packet, to form a second IP data packet, and
 send the second IP data packet towards the UE.

8. The router according to claim 7, wherein the data requested by the UE from the network server further comprises a second requested data, wherein the first IP data packet further comprises another information for instructing another router to add the second requested data to the second IP data packet, wherein sending the second IP data packet towards the UE comprises:

sending the second IP data packet to the UE via the another router.

9. The router according to claim 7, wherein the identifier of the first requested data comprises a first content identifier and/or a first application identifier, and the first content identifier or the first application identifier is an identifier for identifying the first requested data, and the first application identifier is a specific category of the first content identifier.

10. The router according to claim 7, wherein the first IP data packet further comprises: a first type identifier, wherein the first type identifier is used to instruct the first router to add, to the first IP data packet, the first requested data.

11. The router according to claim 7, wherein the first IP data packet further comprises a first location indication identifier, and the first location indication identifier is used to indicate a location of the first requested data in the second IP data packet.

12. The router according to claim 7, wherein the identifier of the first requested data is carried in a sub-option of a hop-by-hop header of the first IP data packet.

13. A non-transitory computer-readable storage medium comprising instructions which, when executed by a computer, cause the computer to implement:

receiving a first Internet Protocol (IP) data packet sent from the network server, wherein the first IP data packet is a response to a data request sent by the UE for requesting data from the network server, wherein the data requested by the UE from the network server comprises a first requested data, wherein the first IP data packet comprises information for instructing the router to add the first requested data to the first IP data packet, and wherein the first IP data packet comprises an identifier of the first requested data but the first IP data packet does not comprise the first requested data;

adding the first requested data locally stored to the first IP data packet, to form a second IP data packet, and sending the second IP data packet towards the UE.

14. The non-transitory computer-readable storage medium according to claim 13, where the data requested by the UE from the network server further comprises a second requested data, wherein the first IP data packet further comprises another information for instructing another router to add the second requested data to the second IP data packet, wherein sending the second IP data packet towards the UE comprises: sending the second IP data packet to the UE via the another router.

15. The non-transitory computer-readable storage medium according to claim 13, wherein the identifier of the first requested data comprises a first content identifier and/or a first application identifier, and the first content identifier or the first application identifier is an identifier for identifying the first requested data, and the first application identifier is a specific category of the first content identifier.

16. The non-transitory computer-readable storage medium according to claim 13, wherein the first IP data packet further comprises one or more of: a first type identifier or a first location indication identifier, where the first type identifier is used to instruct the first router to add, to the first IP data packet, the first requested data, the first location indication identifier is used to indicate a location of the first requested data in the second IP data packet.

17. A system comprising:
a network server; and
an intermediate network device to:
 receive from the network server a first Internet Protocol (IP) data packet in response to a data request from a User Equipment (UE) for requesting data from the network server, wherein the data requested by the UE from the network server comprises a first requested data, wherein the first IP data packet comprises information to instruct the first router to add the first requested data to the first IP data packet, and wherein the first IP data packet comprises an identifier of the first requested data but the first IP data packet does not comprise the first requested data;

add the first requested data locally stored in the intermediate network device to the first IP data packet, to form a second IP data packet; and send the second IP data packet towards the UE.

18. The system according to claim 17, where the identifier of the first requested data is included in a sub-option of a hop-by-hop header of the first IP data packet.

* * * * *